United States Patent [19]
Van Buren, Jr.

[11] 3,814,467
[45] June 4, 1974

[54] CONNECTOR FOR FLEXIBLE CONDUIT
[75] Inventor: Harold S. Van Buren, Jr., Lexington, Mass.
[73] Assignee: TRW Inc., Cleveland, Ohio
[22] Filed: Apr. 17, 1972
[21] Appl. No.: 244,730

[52] U.S. Cl.................. 285/92, 174/65 R, 285/162, 285/DIG. 22
[51] Int. Cl............................................. F16l 5/02
[58] Field of Search............ 174/65 R; 285/81, 128, 285/162, DIG. 4, DIG. 22, 92

[56] References Cited
UNITED STATES PATENTS

| 185,008 | 12/1876 | Young | 285/92 X |
| 1,725,883 | 8/1929 | Recker | 285/162 |
| 1,796,846 | 3/1931 | Kanner | 174/65 R |
| 1,830,250 | 11/1931 | Tiefenbacher | 285/162 |
| 3,183,297 | 5/1965 | Curtiss | 174/65 R |
| 3,221,572 | 12/1965 | Swick | 285/162 X |
| 3,430,991 | 3/1969 | Otto | 174/65 R X |

FOREIGN PATENTS OR APPLICATIONS

| 651,417 | 10/1962 | Canada | 174/65 R |
| 495,130 | 8/1953 | Canada | 285/162 |

Primary Examiner—Henry S. Jaudon
Assistant Examiner—David H. Corbin
Attorney, Agent, or Firm—Hall & Houghton

[57] ABSTRACT

A connector for flexible conduit of the type which is spirally wound to provide continuous, alternating, helically contoured ribs and grooves thereon. The connector, which is formed from spring sheet metal, includes an apertured socket having a dome-shaped web defining at its edge a single helix thread form adjacent the aperture in the socket. The helical edge of the web traverses a path corresponding to that of the helical grooves on the conduit whereby the conduit may be turned into the socket with the edge of the web advancing in the grooves and over the ribs in the manner of a nut thread on a bolt. A fitting joined to the socket carries an apertured disc spaced from the socket which the leading edge of the conduit threaded through the socket ultimately engages to limit the length of the conduit which may be threaded into the connector. The fitting also carries snap acting legs adapted to secure the connector to an apertured support member, e.g., a junction box or an adapter connected to the junction box, when the fitting is inserted into the aperture in said support member. Additionally, the socket element carries a locking tab which both bitingly and tensionally engages the conduit to inhibit reverse rotation of same in a direction which would tend to disconnect the conduit from the connector.

11 Claims, 12 Drawing Figures

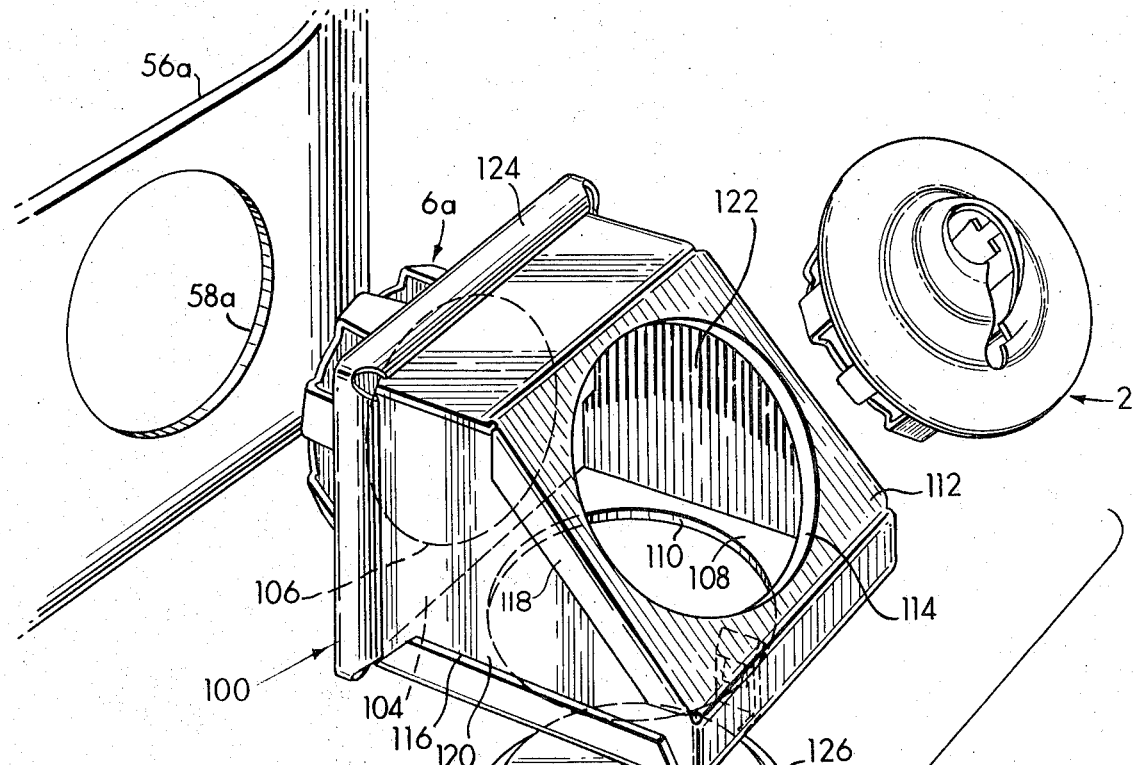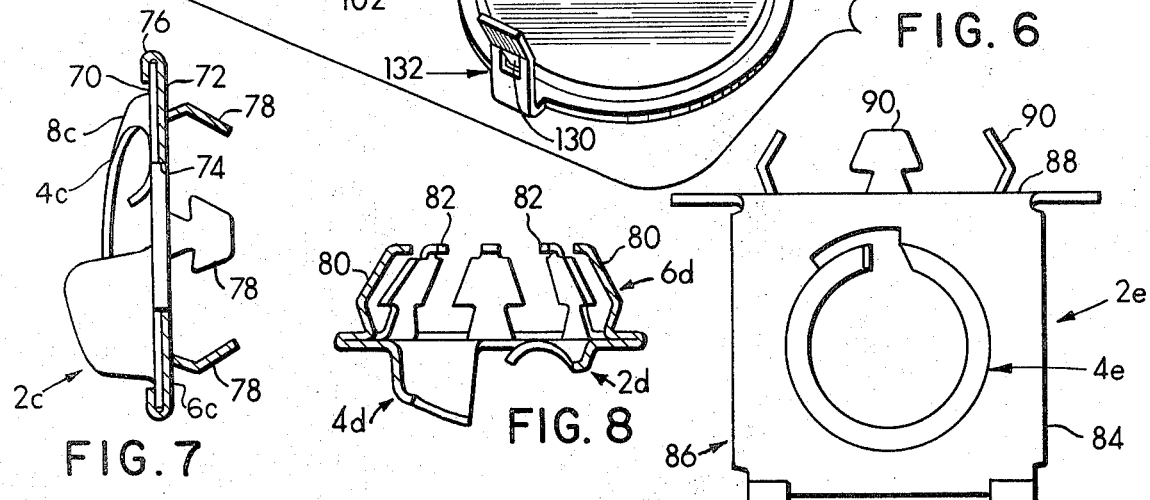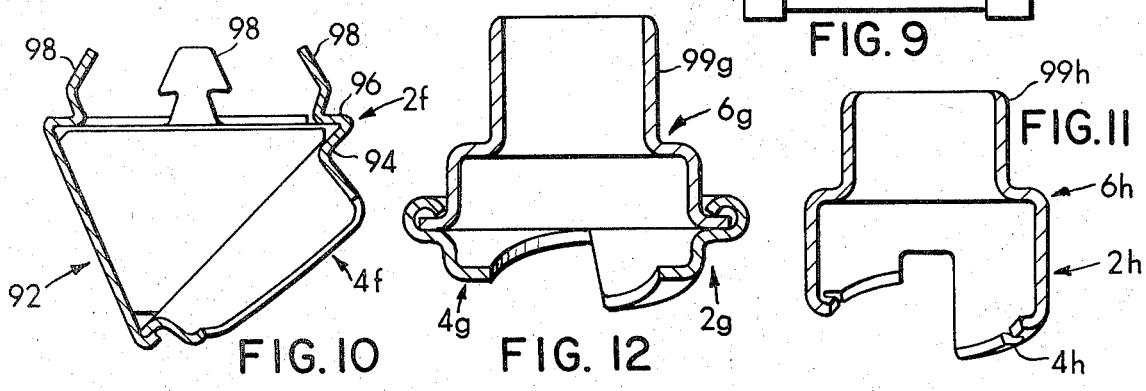

CONNECTOR FOR FLEXIBLE CONDUIT

BACKGROUND OF THE INVENTION

1. Field of the Invention

The invention relates to connectors for flexible conduit or tubing of the types known to the electrical trade as "Greenfield" and "Extraflex." Connectors according to the invention would generally be classified in U.S. Pat. art class 285 entitled "Pipe Joints or Couplings" and more particularly in Subclasses 260 of said class.

2. Description of the Prior Art

The development of the present invention was principally motivated by the desire to satisfy the long recognized need in the electrical trades for an improved connector and coupling system to be used in securing flexible conduit or tubing to supporting members. Such members would include junction boxes, fuse boxes, switch boxes, etc., to mention a few. The conduit or tubing, which provides a protective sheathing for cables or wires running inside the length of the conduit, is usually of a light sheet metal construction and is spirally wound to provide the requisite flexibility. The spiral winding provides continuous, alternating, helically contoured ribs and grooves on the exterior of the conduit. The conduit is frequently referred to in the electrical trade as the "Greenfield" type or "Extraflex" type. While it is envisioned that the disclosed connector and coupling system might well be utilized with other types of wound or corrugated tubing, hoses, etc., some of which might be fabricated from other materials such as rubber or synthetic plastics, the invention will best be understood by considering same in the light of its presently contemplated application.

The components of the improved connector and coupling system are spring metal stampings (ideally a heat treated high carbon steel) which can be automatically blanked, formed and assembled for efficient and economical mass production. In usage, the connector is highly efficient and economical, particularly with reference to the minimal time required to effect a coupling in that the leading end of the conduit is simply turned into the socket portion of the connector in much the same manner as a bolt is turned into a nut, the counter rotation inhibiting locking tab automatically grips the conduit responsive to insertion of same into the connector, and the connector can be quickly fixed to a support such as a junction box by snap seating the fastener portion thereof into an appropriately sized, preformed opening in the support in much the same manner as well-known snap closures such as plug buttons. Moreover, the aforementioned fastening to a support can be accomplished solely by hand, i.e., neither conventional nor special tools are required. If desired, the installation procedure can be varied by first snap seating the connector in the support member and thereafter threading the conduit into the connector. Further, the substantially universal type adapter of the coupling system renders the system and connector adaptable to situations where the leading end of the conduit does not readily align with the opening in the support. The conduit need not be looped or severely bent if the normal orientation of conduit to support is at an angle of substantially 90° or 45° in that the use of the adapter in conjunction with the connector automatically compensates for the nonperpendicular alignment. Still further, the improved connector which provides for only external engagement of the conduit does not reduce the effective inside diameter of same and thus does not restrict the number or size of conductors which might otherwise be conveniently sheathed in a given size conduit.

Conversely, the prior art connectors, which are usually of cast or relatively malleable sheet metal construction, are characterized by component parts such as locking collars or saddle clamps which are secured to the connectors per se by one or more screws or bolts that must be tightened to secure a conduit and inserted into the connector. Another salient characteristic of the known devices is an externally threaded bushing which is inserted into the apertured support, e.g., the junction box, and secured thereto by a separate nut and locking washer which is torqued up on the bushing and against the inboard surface of the supporting member. Some of the prior art devices include an elongated tubular element which is inserted into the leading end of the conduit and carries lugs or partial threads which internally engage the ribs and grooves of the conduit. The last mentioned connector types of course reduce the effective inside diameter of the conduit and thus may restrict the number or size of conductors which can be conveniently run therethrough. I am unaware of any prior art coupling system comparable to that disclosed for compensating for other than substantially perpendicular alignment of the conduit end with the apertured support member. The earlier practice has been to severely bend or loop the conduit to achieve a straight in connection or to utilize a plurality of modified connectors per se, which connectors have their locking collars oriented to the threaded bushing at 60° or 45° or 30° angles or are connected to the bushing through 90° bend elbows. Thus, with the above mentioned background in mind, it is submitted that one who proceeds to a reading of the detailed description of the improved connector and coupling system which follows will readily appreciate the contribution to the art of the device disclosed herein. One will further appreciate that the objective which motivated the development has been realized.

SUMMARY OF THE INVENTION

A connector for flexible conduit of the type which is spirally wound to provide continuous, alternating, helically contoured ribs and grooves thereon. The connector includes a conduit receiving and retaining socket having an annular base element and a radially slotted, domed web projecting outwardly from the base element. The web has a conduit receiving opening defined by the internal edge of the web which traverses a helical path generally corresponding to the path of the grooves on the conduit. The leading portion of the helical web edge is spaced from the adjacent surface of the base element a distance substantially equal to the width of the ribs on the conduit, whereby the said edge will advance in the conduit grooves and over the ribs when the conduit is turned into the socket opening in a manner similar to a nut thread advancing on a bolt. The connector also includes a fitting having a disc joined to but spaced axially from the web and base element which limits the length of conduit which may be turned into the connector. The fitting also carries snap acting spring legs for seating the connector in an opening in an electrical junction box or an adapter connected to the junction box.

BRIEF DESCRIPTION OF THE DRAWING

FIG. 6 is an exploded perspective view of an apertured support and the components of a conduit coupling system according to the invention;

FIGS. 7 through 12 are side elevational or transverse cross sectional views of six modified forms of connectors according to the invention.

DESCRIPTION OF A PREFERRED EMBODIMENT

The components of an improved connector 2 according to the invention are preferably blanked and formed from a sheet steel of relatively high carbon content and thereafter assembled and hardened by heat treatment to provide increased strength and resiliency.

Figure 4:
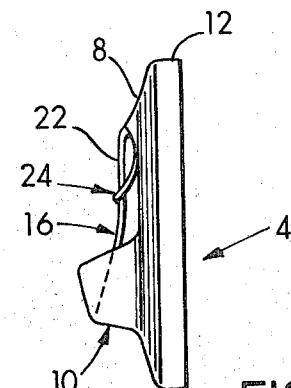
FIG. 4 is a side elevational view of the socket component of the connector prior to the assembly of same with the fitting component.

The two main components of the connector are the socket 4 (which is depicted in its preassembled state in FIG. 4) and the fitting 6.

The socket 4 includes an annular, concavo-convex base element 8, a domed web 10 projecting outwardly from the convex face of the base element and a circumferential flange 12 extending from the peripheral edge of the base element outwardly of the concave face thereof. A generally centralized opening 14 extends through the web 10 and the base 8, and said opening is at least partially defined by the inner edge 16 of the web. A radial slot 18 which communicates with the opening 14 interrupts the web and cuts slightly into the base element. The edge 16 of the web traverses a substantially helical path commencing at a leading portion 20 disposed adjacent the slot 18 and substantially axially spaced from said base element and terminating in a trailing portion 22 lying substantially in the plane of the base element. A locking tab 24, which is partially severed from the base element 8 and bent upwardly out of the plane thereof, has an inner edge 26 forming essentially a continuation of the trailing portion 22 of the web edge and a free end 28 disposed above the base element and presenting a relatively sharply pointed corner 30 adjacent the inner edge 26.

Figure 1:
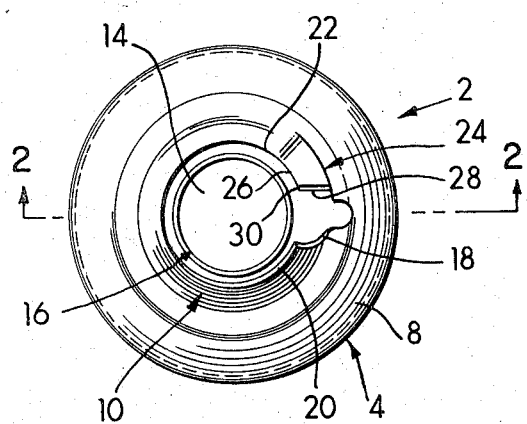
FIG. 1 is a top plan view of a connector according to the invention.
Figure 2:
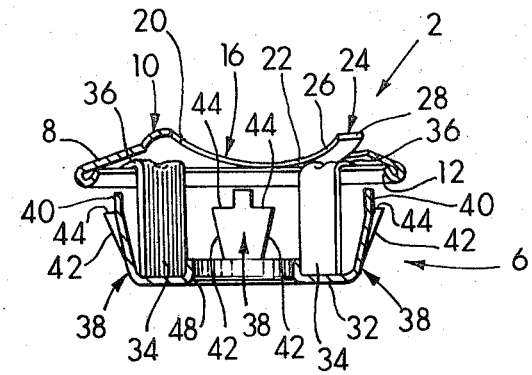
FIG. 2 is a transverse cross section of the connector taken on line 2—2 of FIG. 1.
Figure 3:
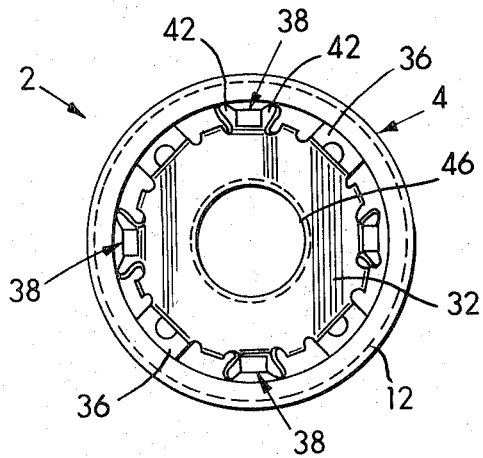
FIG. 3 is a bottom plan view of the connector.

A second connector component, to wit, the fitting 6, includes a flat, substantially circular disc 32, and a plurality of circumferentially spaced, substantially straight legs 34 integrally joined to the disc 32 at its periphery and extending upwardly therefrom and terminating in relatively short, right angularly bent flanges 36 projecting radially outwardly from said legs at their ends remote from the disc 32. As best seen in FIGS. 2 and 3, the socket 4 is joined to the fitting 6 by curling the flange 12 under the flanges 36 and clamping the latter against the concave face of the base element 8. The aforementioned assembly is carried out prior to final heat treating of the steel components. The fitting 6 also includes a plurality of spring legs 38 which are likewise joined to the periphery of the disc 32 and extend upwardly therefrom. The spring legs are disposed between adjacent straight legs 36, but the bend in the former at the juncture with disc 32 is of a longer radius, ergo the spring legs lie radially outwardly of the straight legs. Each of the spring legs terminates in an upper free end portion 40 which is slightly spaced from the underside of the curled flange 12 on the socket and each spring leg carries a pair of wings 42 which are splayed still further radially outwardly and terminate below the free end portion 40 to define abrupt circumferentially extending shoulders 44. All portions of the spring legs, however, lie radially inwardly of the periphery of the base element 8 of the socket.

From a further consideration of FIGS. 2 and 3, the reader will observe that the disc 32 has a centralized opening 46 formed therein which opening is axially aligned with the opening 14 in the socket component and is defined by the smooth inner wall of a short tubular extension 48 drawn from the disc and extending toward the socket.

Figure 5:
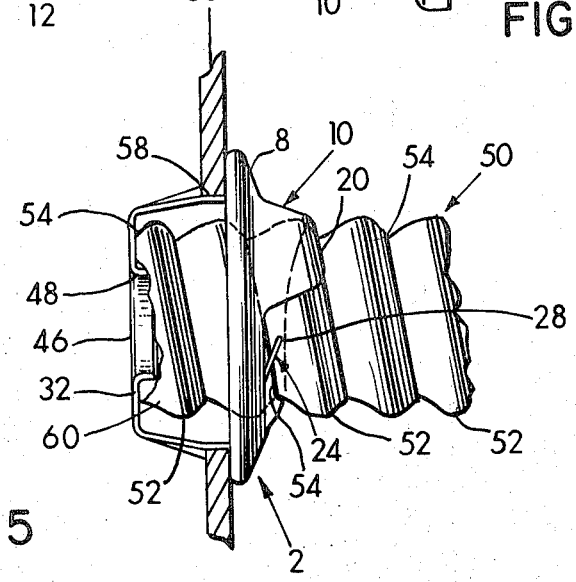
FIG. 5 is an elevational view of an installation depicting the connector joined to an apertured support and a fragmentary portion of a spirally wound conduit fully turned into the connector.

The reader should now refer particularly to FIG. 5 which depicts an installation embodying the improved connector. The illustrated fragmentary length of conduit 50 is of the "Greenfield" type earlier mentioned which is spirally wound to provide continuous, alternating, helically contoured ribs 52 and grooves 54 thereon. Typically the length of the conduit 50 would run between electrical junction boxes such as a primary fuse box and a secondary fuse box, or a fuse box and a switch box or outlet box and would sheathe one or more wires or cables, i.e., conductors running between the boxes and connected to the electrical terminals housed therein. The support 56 illustrates one wall of a junction box having a circular opening 58 formed therein.

When the length of conduit required for a given run has been determined, a strip is usually cut from a conduit coil with the cut made substantially adjacent one of the grooves 54, i.e., the minimum diameter point of the conduit, whereby a short helical lip or lead-in 60 is left at each end of the conduit length. The conduit is thereafter assembled with the connector(s) by inserting the lip or lead-in 60 into the opening 14 in the socket adjacent the radial slot 18 so that the lip engages the undersurface of the web 10 and the leading portion 20 of the helical web edge seats in the first groove 54 on the conduit, and turning the conduit in a right hand or clockwise direction (or alternatively the connector left hand or counterclockwise) whereby the web edge advances in the continuous helical grooves and the web moves over succeeding helical ribs in the manner of a nut thread advancing on a bolt thread. Thus the conduit is turned into and through the opening 14 in the socket 4 until the leading end of the conduit bottoms on the inner surface of the disc 32, at which point the web will have passed over one or more convolutions of ribs and, as illustrated in FIG. 5, will lie in one of the later, i.e., the third convolution of groove 54 and overlie the trailing surface of the second full rib convolution 52 to thereby draw the leading end of the conduit tightly against the disc 32 and establish a secure coupling between the connector and conduit which is highly efficient in resisting separation of the parts ever if a substantial axial pull is exerted thereon. As the leading end of the conduit is turned up against the disc 32, the leading surface of the second rib convolution 52 adjacent the second groove convolution 54 depresses the spring tab 24 toward the plane of the base element 8 and, responsive to said depression, the tab exerts a reverse axial bias on the conduit to tension the second rib convolution 52 against the undersurface of the domed web 10. Further, the sharp free edge 30 of the tab tends to bite into the surface of the conduit adjacent the second groove convolution 54. This combination of frictional or tensional bias and pawl-like gripping of the conduit results in a locking action thereon which is effective to inhibit counter rotation of the conduit which would tend to back it out of the connector. In other words, the automatic locking action of the spring tab 24 provides substantial resistance to accidental rotational separation of the conduit from the connector.

The reader will also observe that the external diameter of the tubular extension 48 of the connector is slightly less than the internal diameter of the conduit and that said extension seats a short distance into the leading end of the conduit when the latter is tightened against the disc 32. The center of opening 46 is thus substantially aligned with the longitudinal axis of the conduit, and conductors running through the conduit can be conveniently fed through opening 46 to effect connections to electrical terminals. Further, the smooth bore of the tubular extension 48 and the internal arcuate bend at its junction with disc 32 reduces the potential for damage, i.e., cutting or piercing of the insulation on a conductor, even if the latter must be severely bent as it leaves the opening 46 to reach a designated terminal. After the connector is coupled to the conduit as aforesaid, the installation is completed by snap seating the fitting 6 in the aperture 58 in support 56. The diameter of the aperture 58 is predetermined to provide an opening large enough to permit unimpeded passage of the disc 32 and straight legs 34 therethrough. The diameter of the aperture is, however, less than the diametrical distance across the outboard edges of the wings 42 on opposed spring legs 38. The spring legs 38 are therefore cammed radially inwardly as the fitting is inserted into the aperture 58 until the shoulders 44 on the wings clear the remote surface of the support 56, at which point the spring legs snap radially outwardly to the position depicted in FIG. 5, i.e., the shoulders 44 grip the said remote support surface adjacent the periphery of aperture 58 and the free ends 40 of the spring legs remain seated in and bear tightly against the wall of the support defining the aperture 58. Further, the distance from the shoulders 44 to the most proximate surface of the flange 12 of the socket component is predetermined with relation to the prevailing wall thickness of commercial junction boxes used in the trade to insure an effective grounding of the connector to the support in that the peripheral undersurface of flange 12 on the socket is drawn tightly against one surface of the support 56 and the shoulders 44 on the snap legs bitingly grip the remote surface of the support.

One will readily appreciate that the procedure for effecting the above described installation can be reversed (assuming that the opposite end of the conduit is not fixed), by first mounting the connector on the support and subsequently turning the conduit into the connector, so long as care is taken to insure that the conductors running within the conduit are guided through the opening 46 in the fitting disc 32. Regardless of the procedural sequence one follows, however, the installation can be accomplished by hand and completed in a few seconds and, in any event, in substantially less time than is required to effect similar installations utilizing the prior art connectors.

FIG. 6 depicts a conduit coupling system according to the invention, of which the principal components are the above described preferred embodiment of the connector 2, a component which is best termed a universal type adapter 100 and a closure cap 102. The adapter 100 is essentially a hollow, sheet metal, multisided, boxlike housing including a first side 104 having an opening 106 formed therein, another side 108 disposed at 90° to the first side and having an opening 110 formed therein, and another side 112 disposed at substantially 45° to the aforementioned sides and having an opening 114 formed therein. The various sides of the housing are held together by flanges such as 116, 118 joined to the opposite edges of sides 112, 108, respectively, and crimped over adjacent sides, i.e., sides 120 and 122. A fitting 6a which is substantially identical to that earlier described is fastened to the adapter at the outer surface of side 104 by a bezel 124 which is crimped over flanges projecting from said side. The bezel 124 has an opening corresponding to and communicating with the opening 106, both of which openings are axially aligned with the opening in the disc of the fitting 6a.

The coupling system was developed to simplify the connection of conduit runs to junction boxes in situations wherein circumstances do not permit the convenient perpendicular alignment of the conduit and the opening 58a in the support 56a. For example, if the conduit run to which connector 2 has been attached conveniently aligns at substantially 45° to the support 56a, the conductors sheathed by the conduit are drawn through the connector 2 and in turn passed through the adapter openings 114 and 106, the communicating opening in bezel 124, the opening in fitting 6a, and the opening 58a in the support. Thereafter, the fitting 6a on the adapter is snapped into the opening 58a and the connector 2 is subsequently snapped into the opening 114 in the adapter. If the normal alignment of the conductor end is at 90° to the support and opening 58a, the conductors are drawn through the connector 2 and first passed into the adapter opening 110 and the connector is later snapped into the last mentioned opening. Obviously, in either instance, one may fasten the connector to the adapter prior to snap seating the adapter in the support opening. It is equally obvious that the first side 104 of the adapter may be rotatably oriented to an infinite number of parallel positions relative to the support 56a. The adapter is therefore effective to accommodate almost any angular orientation of the conduit end to the support which normal usage conditions might dictate and thus eliminates the need for excessive bending or looping the conduit to effect a coupling. The adapter also eliminates the need for a multitude of distinct connectors having 90° or 45° elbows or other distinct bends in the collars or attaching portions thereof.

Cap 102 is adapted to effect a closure of opening 110 or opening 114 in the adapter depending on which of said openings receives the connector 2 in a given installation. The cap is a shallow hat-shaped disc having a crown 126 which will fit snugly in either of the last mentioned openings and a rim 128 which will overlie the adjacent external surface of either side 108 or side 112 of the adapter. The cap is secured by lugs 130 struck inwardly from integral spring arms 132 extending upwardly from the rim of the cap, which lugs are adapted to snap over and grip the edges of either opposed flanges 116 or opposed flanges 118 when the cap is seated in either the opening 110 or the opening 114.

DESCRIPTION OF MODIFIED EMBODIMENTS

FIG. 7 depicts a modified two-part connector 2c including a socket 4c which is similar to the above described socket 4, but has a peripheral flange 70 extending from its base element 8c. The fitting 6c comprises a base 72 having an opening 74 communicating with the socket opening, a rim 76 which is curled over the flange 70 to secure the fitting to the socket, and a plurality of angularly bent spring legs 78 for snap seating the connector in an apertured support.

The connector 2d of FIG. 8 is of unitary construction and includes socket 4d and integral fitting 6d embodying a plurality of snap legs 80 having inturned free ends 82 for engaging the leading end of a conduit turned into the connector.

FIG. 9 depicts one side 84 of a connector 2e comprising a generally rectangular box housing 86 having a socket 4e formed therein and disposed at 90° to the apertured upper side 88 of the housing from which a plurality of spring legs 90 project.

The connector 2f shown in FIG. 10 comprises a generally triangular (as viewed in cross section) housing 92 having a socket 4f formed in one side 94 thereof, which side is disposed at an angle of approximately 60° to apertured side 96 of the housing from which spring legs 98 project.

The connectors 2g and 2h of FIGS. 11 and 12, respectively, are substantially modified relative to the earlier described connectors in that the separate fitting 6g to which socket 4g is crimped and the fitting 6h which is integrally joined to socket 4h embody eyelets 99g and 99h, respectively, which are adapted to be curled over the remote surface of an apertured workpiece to effect a more permanent attachment than that achieved with the snap seated connectors heretofore described.

Having considered the foregoing detailed description of a preferred embodiment of the connector and coupling system as well as the description of several modified forms of connectors, the reader should now appreciate that the design objectives earlier set forth have been realized. The reader should further understand that the description above is to be interpreted in an illustrative rather than a limiting sense and that the scope of the invention protected by these Letters Patent is best defined by the claims which follow.

I claim:

1. A connector for securing a flexible conduit of the type which is spirally wound to provide continuous, alternating, helically contoured ribs and grooves thereon to an apertured support, said connector comprising a conduit receiving socket, said socket having an annular base element and a radially slotted, domed web projecting outwardly from one surface of said base element, fastening means for effecting a coupling of said connector to the apertured support, said fastening means being joined to said socket at said base element and projecting outwardly therefrom in the opposite direction from said domed web, said web being provided with a generally centrally located conduit receiving opening, the edge of said web defining said opening traversing a helical path commencing at the end of said web adjacent said radial slot, said helical path being in general correspondence with the helical path traversed by the grooves on the conduit, said helical edge having a leading portion axially spaced from said one surface of said base element and a trailing portion disposed substantially in the plane of said one surface, said leading edge being spaced from said surface a distance substantially equal to the width of the ribs on the conduit, whereby the said edge of said web will advance in the grooves and over the ribs of the conduit when the latter is turned into said opening in the manner of a nut thread advancing on a bolt thread and the web will overlappingly grip the ribs on the conduit to securely couple the latter to the connector, and means, joined to said socket and spaced from said base element, for limiting the extent of permissible penetration of the conduit through said socket and into said connector.

2. A connector according to claim 1 which is formed from spring sheet metal.

3. A connector according to claim 2 wherein said socket includes counter rotation inhibiting means adapted to engage portions of a conduit turned into said socket and thereby resist unintentional disconnection of the conduit.

4. A connector according to claim 3 wherein said counter rotation inhibiting means comprises a resilient locking tab on said socket disposed between said radial slot and said trailing helical edge of said web, said tab having an inboard edge forming a continuation of said trailing edge of said web and being partially severed from said base element and bent out of the plane of said element and projecting outwardly from said one surface thereof in the direction of said web, the axial distance between said outwardly bent portion of said locking tab and said means for limiting the extent of penetration of the conduit into said connector being predetermined so that when the leading end of the conduit engages said means, said tab will be biased by a rib on the conduit back toward said one surface of said socket base element and apply a locking tension to said conduit which inhibits counter rotation of same.

5. A connector according to claim 4 wherein said locking tab has a relatively sharply pointed inboard edge adjacent said radial slot, said edge being adapted to bitingly engage the conduit when the latter is seated in said connector to further inhibit counter rotation of said conduit.

6. A connector according to claim 1 wherein said fastening means is a snap acting fastening means.

7. A connector according to claim 1 wherein said base element has a concavo-convex configuration with the concave face thereof disposed remote from said one surface thereof.

8. A connector according to claim 1 wherein said means for limiting the extent of permissible penetration of the conduit into said connector comprises a disc disposed in axially spaced, generally parallel relationship to the said surface of said base element remote from said one surface, said disc being connected to said base element by a plurality of circumferentially spaced, relatively rigid legs having one end thereof joined to said base element adjacent said remote surface thereof and extending generally perpendicularly therefrom and other ends thereof joined to the periphery of said disc, said disc having a substantially centralized opening therethrough in axial communication with the opening defined by said web, said opening in said disc being defined by the internal wall of a smooth bored, tubular extension joined to and projecting from said disc toward said base element, the outer diameter of said tubular extension corresponding generally to the inner diameter of the conduit, whereby the leading end of the conduit will bottom on the surface of said disc adjacent said tubular extension when the conduit is fully turned into said connector with the longitudinal axis of the conduit generally axially aligned with the said opening in said disc.

9. A connector according to claim 8 wherein said fastening means comprises a plurality of resilient legs each joined to the periphery of said disc and extending from said juncture toward said base element, said legs being disposed radially outwardly of said relatively rigid legs connecting said disc to said base element, and said resilient legs being adapted to snap seat in an apertured support and having means adapted to engage the surface of the support adjacent the aperture therein to securely retain the connector in assembly with the support.

10. A connector according to claim 9 wherein each of said resilient legs is joined to said disc between adjacent of said relatively rigid legs and each of said resilient legs terminates in a free end lying proximate to but spaced from the surface of said base element remote from said one surface.

11. A connector for a flexible conduit of the type which is spirally wound to provide continuous, alternating, helically contoured ribs and grooves thereon, the said connector comprising an apertured socket having means traversing a helical path for threadedly receiving and engaging external portions of a conduit turned into said socket, means for engaging the leading end of a conduit turned into said socket to limit the extent of penetration of the conduit into said connector, a resilient conduit engaging and locking tab, said locking tab being formed integral with said first aforementioned means and having a portion thereof axially offset from said helical path in a direction opposite said second mentioned means, said axially offset portion being positioned to be deflected by a conduit rib in a direction substantially parallel to the longitudinal axis of the conduit and being spaced from said second mentioned means a predetermined axial distance so as to be biased toward said second mentioned means and tensioned against a rib of the conduit responsive to the turning of the conduit into said socket to the extent that the leading end of the conduit engages said second mentioned means to thereby inhibit counter rotation of the seated conduit relative to the connector, and fastening means for securing said connector to an apertured support.

* * * * *